Figure 4:
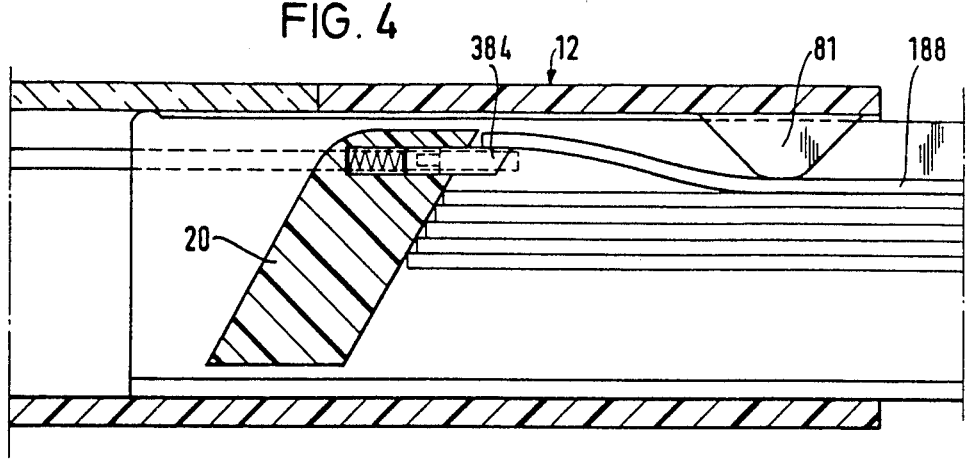

United States Patent [19]

Ackeret

[11] Patent Number: 4,745,697
[45] Date of Patent: May 24, 1988

[54] DEVICE FOR THE CYCLIC REARRANGEMENT OF A PILE OF SHEETS

[75] Inventor: Peter Ackeret, Kusnacht, Switzerland

[73] Assignee: Licinvest AG, Chur, Switzerland

[21] Appl. No.: 901,530

[22] PCT Filed: Nov. 12, 1985

[86] PCT No.: PCT/EP85/00610
§ 371 Date: Jul. 11, 1986
§ 102(e) Date: Jul. 11, 1986

[87] PCT Pub. No.: WO86/03024
PCT Pub. Date: May 22, 1986

[30] Foreign Application Priority Data

Nov. 13, 1984 [DE]  Fed. Rep. of Germany ....... 3441464

[51] Int. Cl.⁴ ............................................. G09F 11/30
[52] U.S. Cl. ......................................... 40/513; 40/476
[58] Field of Search ............... 40/10 R, 513, 476, 122, 40/511, 490

[56] References Cited

U.S. PATENT DOCUMENTS

| | | | |
|---|---|---|---|
| 2,577,366 | 12/1951 | Reiss | 40/513 |
| 3,234,673 | 2/1966 | Cook | 40/10 R |
| 3,568,345 | 3/1971 | Grosse | 40/476 |
| 3,797,144 | 3/1974 | Weggeland | 40/476 |
| 4,242,820 | 1/1981 | Ackeret | 40/513 |
| 4,245,417 | 1/1981 | Ackeret | 40/513 |
| 4,254,567 | 3/1981 | Koller | 40/513 |
| 4,550,516 | 11/1985 | Ackeret | 40/10 R |
| 4,674,209 | 6/1987 | Ackeret | 40/513 |

FOREIGN PATENT DOCUMENTS 0085186  8/1983  European Pat. Off. .
0113057  7/1984  European Pat. Off. .

*Primary Examiner*—Gene Mancene
*Assistant Examiner*—Wenceslao J. Contreras
*Attorney, Agent, or Firm*—Jeffrey H. Ingerman

[57] ABSTRACT

The invention relates to a device for a cyclic rearrangement of a pile (182) of sheets having a housing (12) with a viewing window (35) and a slider member (14) that can be pulled out of the housing (12) and pushed back into the housing again parallel to the latter, and having a sheet-changing mechanism by means of which one sheet in the pile (182) is retained in the housing while the slider member (14) transports the remainder of the pile out of the housing (12), means being provided for removing the sheet remaining in the housing (12) from the housing (12) through the opening provided in the housing for the slider member (14).

10 Claims, 2 Drawing Sheets

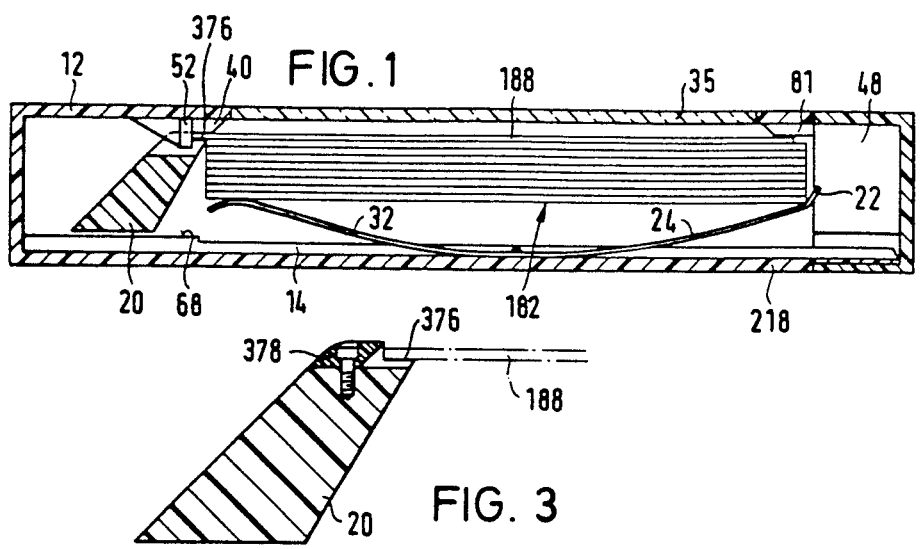
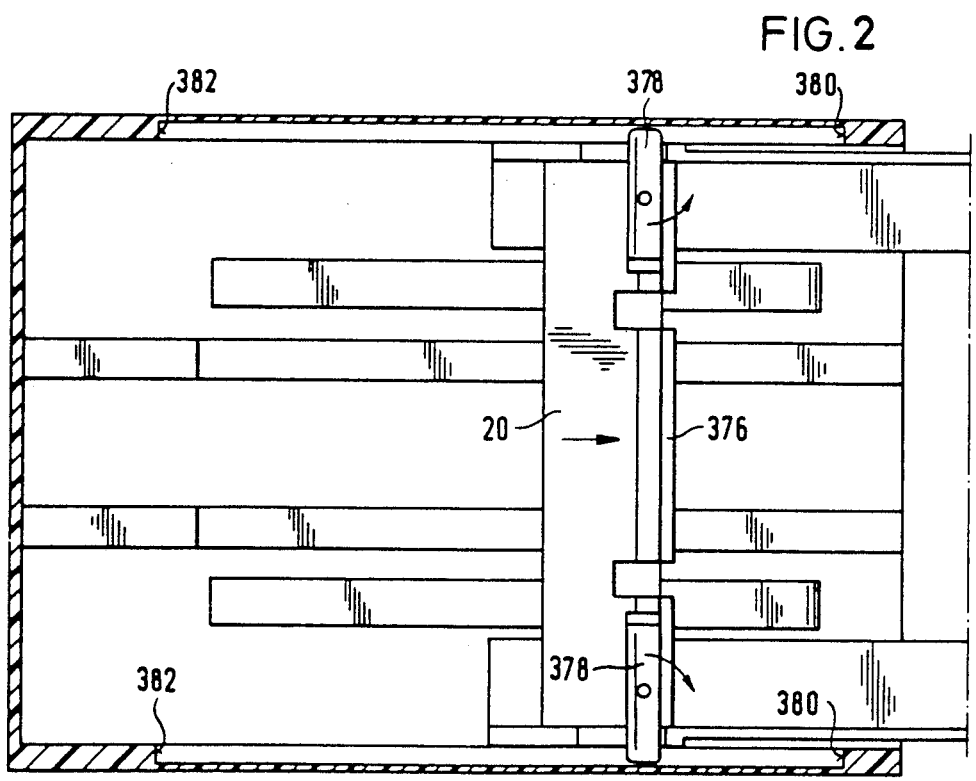

DEVICE FOR THE CYCLIC REARRANGEMENT OF A PILE OF SHEETS

The invention relates to a device for the cyclic rearrangement of a pile of sheets. A device of that general kind is described and shown in U.S. Pat. No. 4,245,417.

The known device comprises a housing having a viewing window and a slider member that can be pulled out of the housing and pushed back into the housing again in a direction parallel to the plane defined by the window. A sheet-changing mechanism ensures that one sheet in the pile, for example the sheet remote from the viewing window, remains in the housing when the slider member is pulled out and is returned to the other end of the pile as the slider member is pushed in again. A manually-operated member is provided to disengage the sheet-changing mechanism so that the slider member then transports the entire pile out of the housing in order, for example, to enable the pile to be exchanged.

Picture-changing mechanisms that can be rendered inoperative are relatively complicated and, when they are in their operative condition, do not allow reliable picture-changing every time.

The problem on which the invention is based is to provide a sheet-changer of the type mentioned in the introduction in which the removal of the picture remaining in the housing is effected in a simpler manner.

To solve this problem there is proposed a device for the cyclic rearrangement of a pile of sheets having a housing with a viewing window and a slider member that can be pulled out of the housing and pushed back into the housing again parallel thereto and having a sheet-changing mechanism by means of which one sheet in the pile is retained in the housing while the slider member transports the remainder of the pile out of the housing, means being provided to take the sheet remaining in the housing out of the housing in the same direction as the slider member. The separate operations of removing an individual sheet and removing the remainder of the pile allow extremely simple solutions which do not depend on inactivating the changing mechanism.

In a first preferred solution, these means comprise an "auxiliary slider member" which can be actuated in the same direction as the slider member when the slider member is out and pushes the remaining sheet "after" the pile.

In a second preferred solution, the arrangement is such that when there is more than one sheet in the changer, the latter always "changes", thus, one picture always remains in the housing. If, however, the remainder of the pile is removed from the slider member when it has been pulled out, then when the slider member is pushed back into the housing again the sheet remaining in the housing is transported by the slider member as it is pulled out again and can be removed therefrom.

The attached drawings show an example of this construction in substantially schematic form. As regards the details of the construction of a complete sheet-changer, a person skilled in the art can refer to the publication mentioned in the introduction and the present invention can be applied to the embodiments thereof.

Figure 5:
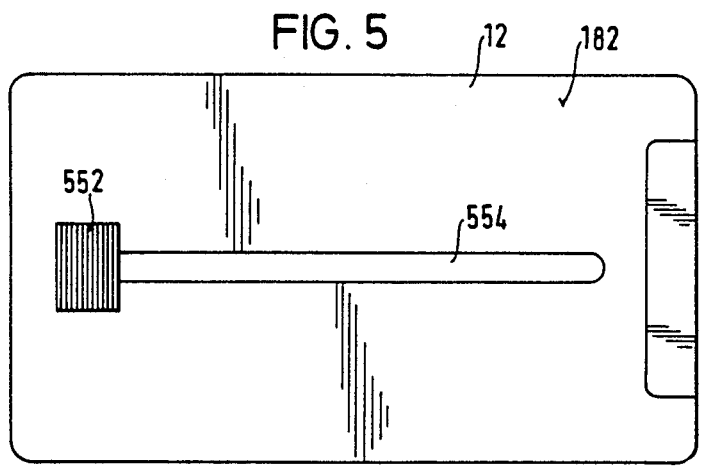
Figure 6:
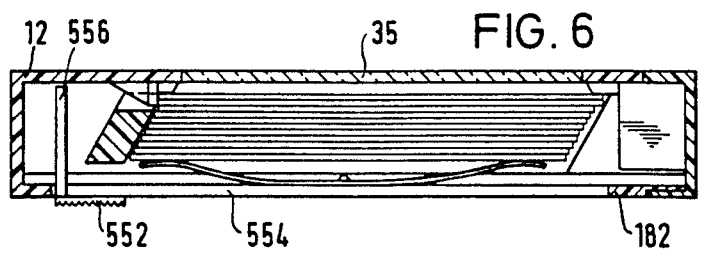

The attached drawings are as follows:

FIG. 1 shows a substantially diagrammatic longitudinal section through a first embodiment, the slider member having been pushed into the housing, FIG. 2 shows the first embodiment in a substantially diagrammatic partial horizontal section, FIG. 3 shows a cross-section through the separator bar from FIG. 2, FIG. 4 shows a further embodiment in a sectional representation similar to FIG. 1, and FIGS. 5 and 6 show a final embodiment, FIG. 5 from below, and FIG. 6 in a longitudinal section similar to FIG. 1.

In FIG. 1 the device comprises a housing 12 to the floor 218 of which there is secured a pressure-spring system having a first pair 24 of spring arms and a second pair 32 of spring arms, which system presses a pile 182 against a viewing window 35. The slider member is substantially in the form of a frame and has front wall that includes a grip part 48, from which wall two side pieces of L-shaped cross-section extend into the housing 12 and, near their inside ends, are connected by a transverse separator bar 20. In the housing there is provided a transporter, in this case a hook-like member 22 at the end of the spring arm 24. When the slider member 14 is pulled out, the downwards facing oblique surface of the separator bar presses the edges of the pile 182 that are resting against it downwards, while deflecting the spring arms 32, until the bottom-most sheet in the pile comes to rest behind a land 68 the height of which is matched to the thickness of the sheets so that a sheet of maximum thickness lies just flush behind it. As the slider member is pulled out further, the separator then pushes the pile 182 lying on the slider-member side pieces along the upper surface of this individual sheet 188 which is not transported with the pile because the separator bar 20 does not touch its edge and also because it is arrested by the hook-like members 22 on the spring arms 24. The slider member can be pulled out far enough for the right-hand edge of the sheet 188 in FIG. 1 to be on the left of the slider member and lifted by means not shown. If the slider member is then pushed back, this edge of the sheet slides upwards along the oblique back of the separator bar, over the separator bar and under holding-down ribs 40, the sheet being supported by its opposite edge on stop members 52 fixed to the housing. When the slider member has been pushed in completely, this sheet comes to rest on the top of the pile, the right-hand end of which in FIG. 1 is pressed to the same level by ribs 81, which level is defined by the ribs 40.

This design (as described so far), with slight modifications which are of no importance in the present invention, corresponds to the design known from the publication mentioned at the beginning.

The above description shows that firstly there is no way or removing also the last sheet from the housing once the remainder of the pile has been removed from the slider member 14 when it is out of the housing. For that reason there is provided near the top of the separator bar 20 a step 376 the height of which is approximately equal to that of the maximum sheet thickness. During normal change operation, the edge of the last sheet conveyed to the pile remains on this step. On the separator bar, on either side of the step, there are arranged throw-off lever members 378, which are pivotally mounted about axes that are perpendicular to the direction of removal of the slider member. These lever members reach the position shown in FIG. 2 by running up against stop members 382 provided on the housing 12 as the slider member is pushed into the housing. If the slider member is then pulled out again, the lever-member arms run up against further stop members 380 on the housing and are turned about a small angle which is, however, sufficient to throw off the edge of the sheet resting on the step. The single sheet can then be removed, since only a sheet that has first been thrown off from the step can be held by the transporter 22 in front of the lower through gap in the separator bar. As long, therefore, as the pile consists of at least two sheets, the changing function is carried out; if the "pile" consists of only one sheet, this sheet is transported out of the housing by the slider member during every second change cycle.

FIG. 4 shows an alternative design of the step and control arrangement.

In the separator bar 20 there is accommodated in such a manner that it can slide a support plate 384 which is pressed into the position shown by a spring (not shown) and only when the slider member is pulled out to the full extent is pushed back by running up against stop members on the housing side so far that the edge of the sheet 188 drops or, more precisely, is pressed by holding-down lugs 81, to below the level of the underside of the auxiliary slider member 384. In addition, this variant is based on the same design as is the first embodiment.

FIGS. 5 and 6 show an embodiment, the change function of which corresponds substantially to that of the first embodiment and is for that reason not described again here. In this case, however, the separator bar 20 has, not a step, but a smooth slope, as in the case of the sheet-changers according to the state of the art. If a pile is to be replaced, the sheet remaining in the housing 12 is pushed "after" the slider member by means of an auxiliary slider member 552 which can be moved along a guide 554 in the bottom of the housing 12, the individual sheet sliding over the separator bar 20 and coming to rest on the pile in the slider member, which pile can, of course, also have been removed beforehand.

I claim:

1. Device for the cyclic rearrangement of a pile (182) of sheets having a housing (12) with a viewing window (35) and a slider member (14) that can be pulled out of the housing (12) and pushed back into the housing again parallel to the latter, and having a sheet-changing mechanism by means of which one sheet in the pile (182) can be retained in the housing (12) while the slider member (14) transports the remainder of the pile out of the housing (12), means being provided for removing the sheet remaining in the housing (12) from the housing (12) through the opening in the housing provided for the slider member (14).

2. Device according to claim 1 in which the means are so designed and arranged that once the sheets that are transported out of the housing by the slider member have been removed, the sheet retained in the housing can be brought out by actuating the slider member again.

3. Device according to claim 2 in which the slider member has a separator bar by means of which the sheets lying in the slider member—with the exception of the sheet retained in the housing—are transported, the separator defining a separating and return through gap through which the sheet retained in the housing passes, and the separator having means for keeping the sheet that was the last to pass through the return through gap away from the separating through gap once the slider member has been pushed into the housing.

4. Device according to claim 3, in which the means for keeping the sheet away are rendered inoperative when the slider member is in the fully withdrawn position.

5. Device according to claim 4, in which the means for keeping the sheet away are arranged on the separator bar.

6. Device according to claim 5, in which the separator bar has a stepped member for catching a sheet edge, and that sheet edge is thrown off from this stepped member when the slider member is in the fully withdrawn position.

7. Device according to claim 6, in which there are provided throw-off levers that are actuated by running up against stops on the housing side.

8. Device according to claim 6, in which the stepped member is provided on a support element which can be pulled back into the separator by running up against stops on the housing side.

9. Device according to claim 1 in which the means are so designed and arranged that once the sheets that are transported out of the housing by the slider member have been removed the sheet retained in the housing can be transferred to the withdrawn slider member by means of a auxiliary member.

10. Device according to claim 9 having an auxiliary slider member that is guided in the housing in the direction of movement of the slider member, forms the auxiliary member and acts on the sheet retained in the housing by pushing it.

* * * * *